United States Patent [19]
Gosling

[11] Patent Number: 5,842,263
[45] Date of Patent: Dec. 1, 1998

[54] METHOD AND MANUFACTURE OF AN AXIAL TENSIONED BOLT

[75] Inventor: Martin Charles Gosling, Hamilton, Canada

[73] Assignee: Westinghouse Electric Corporation, Pittsburgh, Pa.

[21] Appl. No.: 584,858

[22] Filed: Jan. 11, 1996

[51] Int. Cl.$^6$ .............................. B23P 11/00; B25B 29/02
[52] U.S. Cl. .......................... 29/452; 81/57.38; 254/29 A
[58] Field of Search .................. 29/452, 525.02; 411/16, 17, 18, 178, 432, 436; 81/57.38; 254/29 A

[56] References Cited

U.S. PATENT DOCUMENTS

| | | | |
|---|---|---|---|
| 3,316,795 | 5/1967 | Tann | 411/17 |
| 3,566,947 | 3/1971 | Jukes | 411/17 X |
| 4,438,901 | 3/1984 | Reneau et al. | 29/452 |

FOREIGN PATENT DOCUMENTS

| | | | |
|---|---|---|---|
| 0609925A | 8/1994 | European Pat. Off. | |
| 863321 | 9/1981 | U.S.S.R. | 81/57.38 |
| 895644 | 1/1982 | U.S.S.R. | 81/57.38 |
| 1150062A | 4/1969 | United Kingdom | |
| 2032822A | 5/1980 | United Kingdom | |
| 2047836 | 12/1980 | United Kingdom | 81/57.38 |
| 2223075 | 3/1990 | United Kingdom | |
| 2236372 | 4/1991 | United Kingdom | |
| 2247928 | 3/1992 | United Kingdom | |
| 2274892 | 8/1994 | United Kingdom | |

OTHER PUBLICATIONS

Goodier, J. N., "The Distribution of Load on the Threads of Screws", *Journal of Applied Mechanics* Mar., 1940, pp. A–10–A–16.

Gosling, M.C., "Improved Turbine Cylinder Bolting System" (unpublished).

Stoeckly, E.E. and Macke, "Effect of Taper on Screw–Thread Load Distribution", *Transactions of the ASME* Jan., 1952, pp. 103–110.

*Primary Examiner*—S. Thomas Hughes
*Attorney, Agent, or Firm*—David G. Maire

[57] ABSTRACT

An axial tensioned bolt and nut for bolting together a turbine or similar piece of equipment. The bolt has parallel threads and the nut has a coil insert. The bolt is stretched and tensioned by a hydraulic tensioner. In one embodiment of the invention, the hydraulic tensioner rests on a bridge element which in turn rests on the surface of the turbine around the nut. The hydraulic tensioner is then attached to the threads of the bolt. The bolt is stretched by the hydraulic tensioner pulling on the bolt while pushing against the bridge. In another embodiment of the invention, a stool with a wide top face rests on the surface of the equipment and the bolt extends through the stool and engages the nut. The bridge element rests on the top face of the stool while the hydraulic tensioner stretches the bolt. In a third embodiment of the invention, a parallel action hydraulic tensioner is attached to both ends of the bolt and pulls the bolt to stretch it.

17 Claims, 7 Drawing Sheets

METHOD AND MANUFACTURE OF AN AXIAL TENSIONED BOLT

FIELD OF THE INVENTION

The present invention relates to an axial tensioned bolt and method to produce it. More specifically, the present invention relates to using a parallel male threaded bolt and a nut with a coil insert to secure flanges together in equipment that requires pretensioned bolting, such as turbines.

DESCRIPTION OF THE PRIOR ART

The prior art discloses using a tapered threaded bolt for pretensioned bolting instead of a parallel threaded bolt. In a parallel threaded bolt, the majority of the stress between the nut and the bolt is located in the first few turns of the thread adjacent to a flange. As a result, the integrity of the nut and bolt is determined by the first few thread turns. Tapered threaded bolts and nuts distribute the stress throughout more of the threads, thus increasing the integrity of the system. However, these tapered threaded items are relatively expensive compared to parallel threaded bolts and nuts.

The prior art discloses that bolts in turbines and other applications are pretensioned by axially rotating the nut to a certain torque. Proper bolt tensioning is ensured by stretching the bolt to a specific elongation. However, rotating the nut to a certain torque is not an accurately repeatable method to stretch a bolt. To ensure a proper elongation of a bolt using the torque method, the bolt is repeatedly stretched and measured until it is achieved. Repeating the stretching and measuring procedure is inefficient.

The prior art discloses the use of an internal micrometer to measure the stretch of the bolt. In order to use an internal micrometer, a bore hole is drilled axially in every bolt. As some of the bolts in a turbine can exceed four feet in length, drilling the bore holes adds a significant cost to the bolt.

It is therefore desirable to provide a pretensioned nut and bolt with parallel threads and no axial bore hole in the bolt. Additionally, it is desirable to provide a single step method to accurately and precisely pretension a bolt without the need to measure bolt elongation.

SUMMARY OF THE INVENTION

Accordingly, it is the general object of the present invention to provide a pretensioned bolt, and a method of pretensioning a bolt. According to the invention, this is achieved by providing a nut with a coil insert and a parallel threaded bolt. The bolt is pretensioned by extending the bolt through a flange, engaging the nut with the bolt, stretching the bolt axially without rotating the nut, and tightening the nut down to the flange surface. Typically, the bolt is stretched by a hydraulic tensioner. Once the hydraulic tensioner is attached to the threaded end of the bolt, the hydraulic tensioner stretches the bolt by pulling the end of the bolt while pushing against the flange.

According to one embodiment of the invention, there is provided a bridge element which rests on the flange and around the nut while the bolt is being stretched. The bridge element provides a foundation for a hydraulic tensioner to rest on while it stretches the bolt. Further, the bridge element can complement and accommodate the flange surface and other surfaces in the vicinity of the bolt.

According to another embodiment of the invention, there is provided a stool which resides between the nut and the flange. The stool has a wide top face that can accommodate a bridge element, thus allowing the bolt to be stretched without the bridge resting on the flange.

According to another embodiment of the invention, there is provided a parallel action hydraulic tensioner which stretches bolts by pulling both bolt ends away from each other.

DETAILED DESCRIPTION OF THE PREFERRED EMBODIMENT(S)

Figure 1:
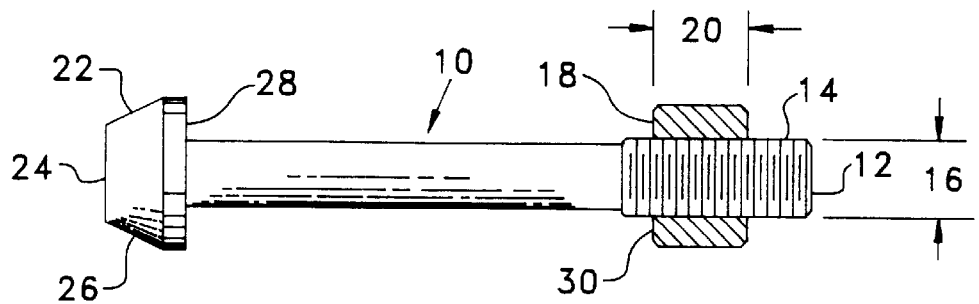
FIGS. 1, 2, and 3 illustrate the different types of bolts that may be used in connection with the practice of the invention.
Figure 2:
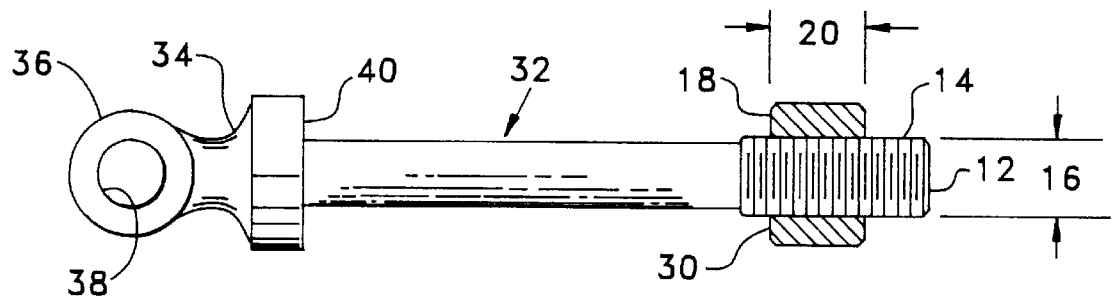
Figure 3:
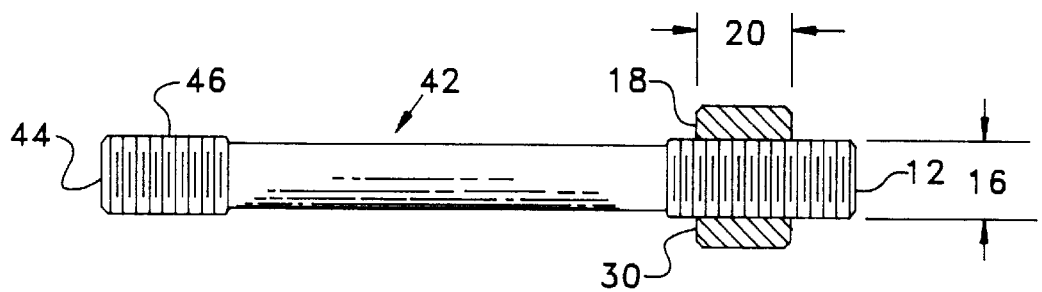

Referring now to FIGS. 1, 2 and 3, bolt 10, ring bolt 32, and stud 42 are shown, respectively. Bolts 10 and 26 and stud 42 each have a first end 12 with parallel male threads 14 and a diameter 16. In the preferred embodiment, parallel male threads 14 are sized to be eight per inch and can be cut or rolled. Each first end 12 is engaged with nut 18 (shown in cross-sectional view). In the preferred embodiment, nut 18 has a height 20 that is approximately equal to diameter 16. Further, nut 18 has a nut underside 30 which is the annular surface of nut 18 which does not face first end 12.

Bolt 10 has a second end 22 with an ultrasonic mount top surface 24, a truncated conical side surface 26, and a flange contact surface 28. Ultrasonic mount surface 24 is a flat surface on the end of second end 22. An ultrasonic elongation measuring system (not shown) can be placed on ultrasonic mount surface 24 in order to measure the length of bolt 10. This eliminates the need to use an internal micrometer to measure bolt 10 elongation. Truncated conical side surface 26 has a smaller diameter end adjacent to sonar mount surface 26 and a larger end adjacent to flange contact surface 28. Flange contact surface 28 faces first end 12 and nut underside 30. When bolt 10 and nut 18 are engaged and holding together a flange (not shown), both flange contact surface 28 and nut underside 30 are in contact with the flange.

Ring bolt 32 has a second end 34 with a ring 36 mounted to it. Ring 36 has a ring aperture 38. Ring 36 is mounted to second end 34 such that the major axis of ring 36 is normal to the major axis of ring bolt 32. The center of ring 36 lies in the major axis of ring bolt 32. Second end 34 has a flange contact surface 40 that faces first end 12 and nut underside 30. Flange contact surface 40 is analogous to flange contact surface 28 of bolt 10. Ring bolt 32 is used when a parallel action hydraulic tensioner is used to stretch the bolt (described below).

Stud 42 has second end 44 which has a parallel male thread 46. Stud 42 is used when a blind flange (not shown) is used or when an additional nut (not shown) is used to secure stud 42.

Figure 4:
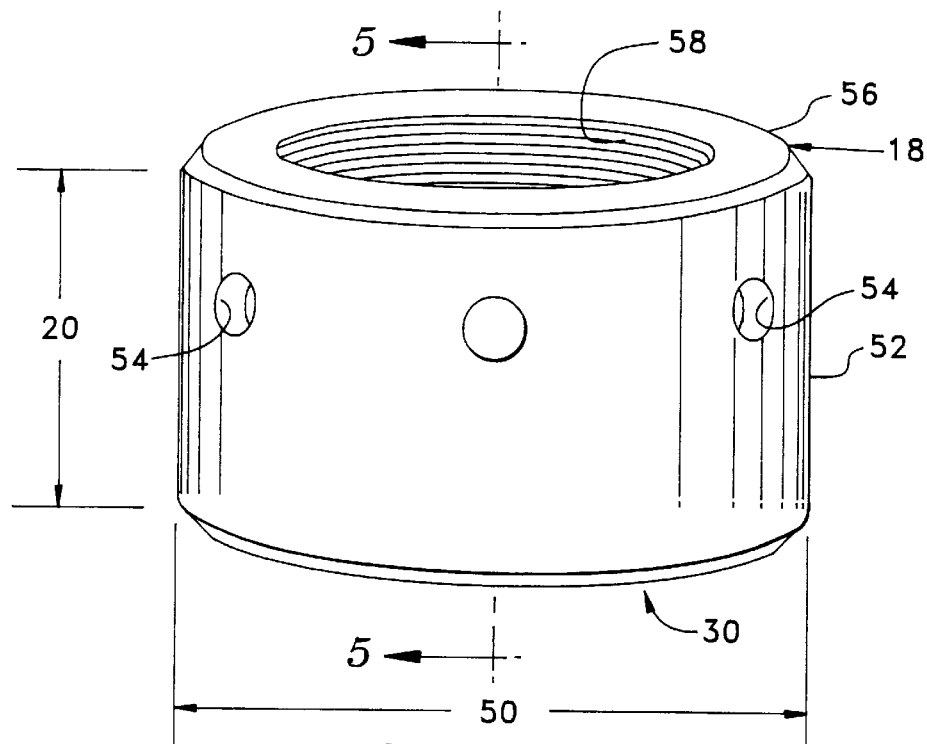
FIG. 4 is a perspective view of a nut that may be used in connection with the practice of the invention.

Now referring to FIG. 4, nut 18 has outer diameter 50, height 20, nut underside 30 (not shown), cylindrical side surface 52, nut top surface 56, and internal threads 58. Spaced laterally around cylindrical side surface 52 are key holes 54. The purpose of key holes 54 is that nut 18 is rotated on first end 12 by placing a key (not shown) into a key hole 54 and moving the key in a circumferential direction.

Figure 5:
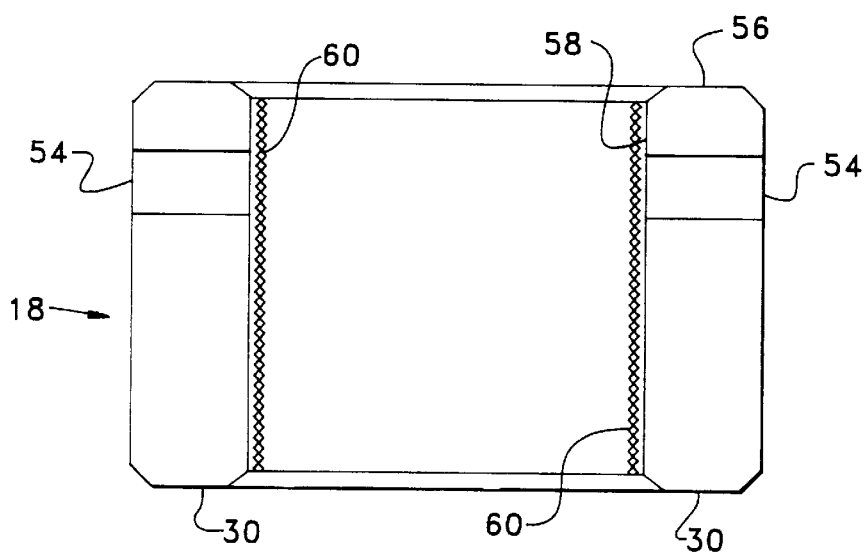
FIG. 5 is a cross-section taken through line 5—5 of FIG. 4.

Now referring to FIG. 5, key holes 54 extend through the wall of nut 18. Nut 18 has coil insert 60 engaging internal threads 58. Coil insert 60 is used because it distributes the force on a bolt relatively evenly throughout parallel male threads 14 when first end 12 of bolt 10 is engaged with nut 18. This allows the use of parallel male threaded bolts and studs instead of cut and tapered threaded bolts and studs.

Figure 6:
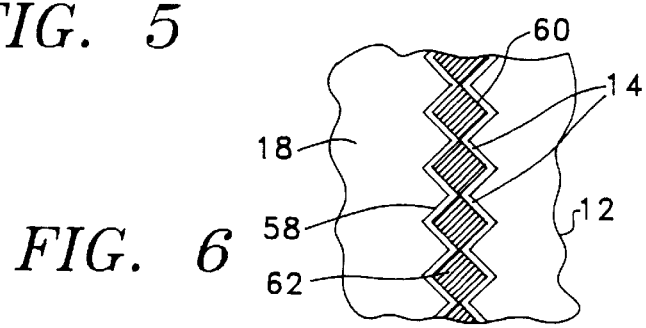
FIG. 6 illustrates a detail of a bolt engaged with a nut.

Now referring to FIG. 6, a detail of a cross section of first end 12 engaged in nut 18 is shown. The parallelogram cross section 62 of coil insert 60 fits in between internal threads 58 and parallel male threads 14.

Figure 7:
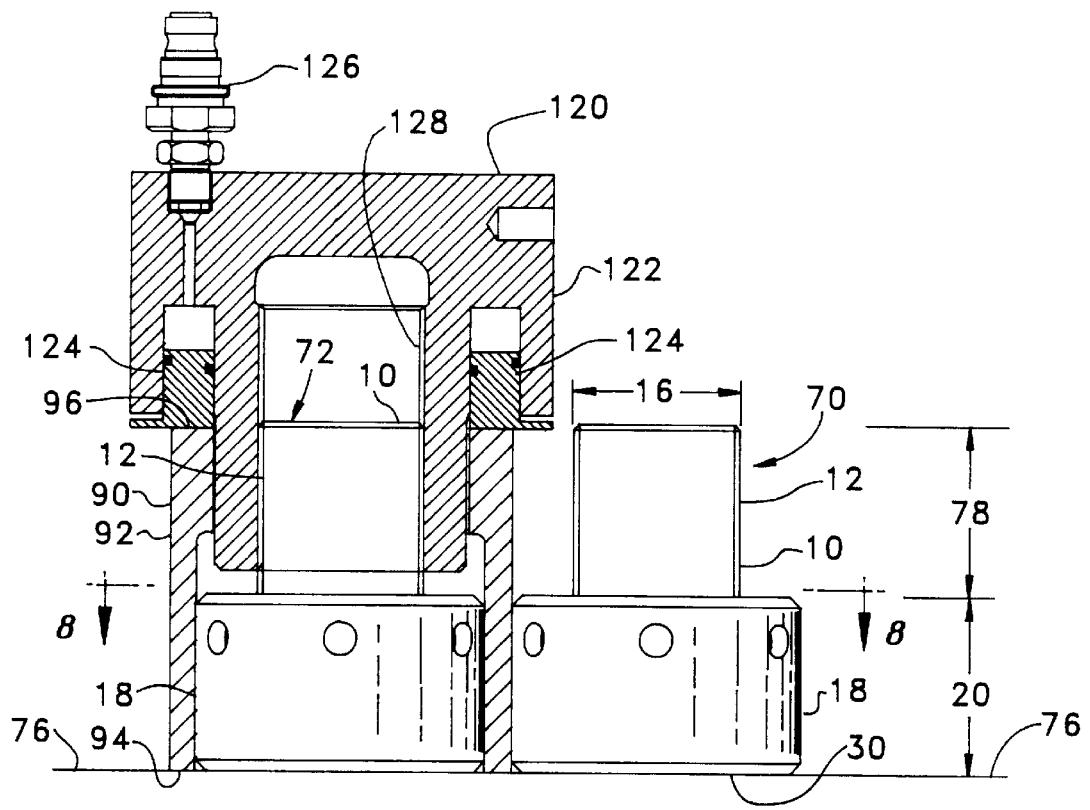
FIG. 7 illustrates a bolt being tensioned using a bridge element and a hydraulic bolt tensioner.

A right nut and bolt system 70 and a left nut and bolt system 72, as depicted in FIG. 7, are holding together flanges 74. Both right and left nut and bolt systems 70 and 72 are comprised of a bolt 10 extending through an aperture (not shown) in flanges 74, first end 12 extending above surface 76 and engaging with nut 18. First end 12 extends above nut 18 a distance 78 which is approximately equal to diameter 16 of bolt 10 and height 20 of nut 18, respectively. Nut underside 30 is adjacent to surface 76. In the preferred embodiment, flange contact surface 28 of second end 22 is adjacent to other flange surface 80. In another embodiment of the invention, a washer is placed between flange contact surface 28 and flange 74 (not shown).

Hydraulic tensioner 120 is mounted on left nut and bolt system 72. In order to mount hydraulic tensioner 120 on any nut and bolt system, bridge element 90 is needed. In the preferred embodiment, bridge element 90 is a tube-like structure with a wall 92, a wall bottom edge 94, a wall top edge 96, and a key opening 98 (see FIG. 8). Bridge element 90 forms the base upon which hydraulic tensioner 120 exerts a force in order to stretch and tension bolt 10. Wall bottom edge 94 rests on surface 76 of flanges 74. Wall 92 surrounds nut 18 and the portion of first end 12 that extends above nut 18. Wall 92 and wall bottom edge 94 are constructed to complement and accommodate surface 76 and anything else in the vicinity of the bolt being tensioned.

Figure 8:
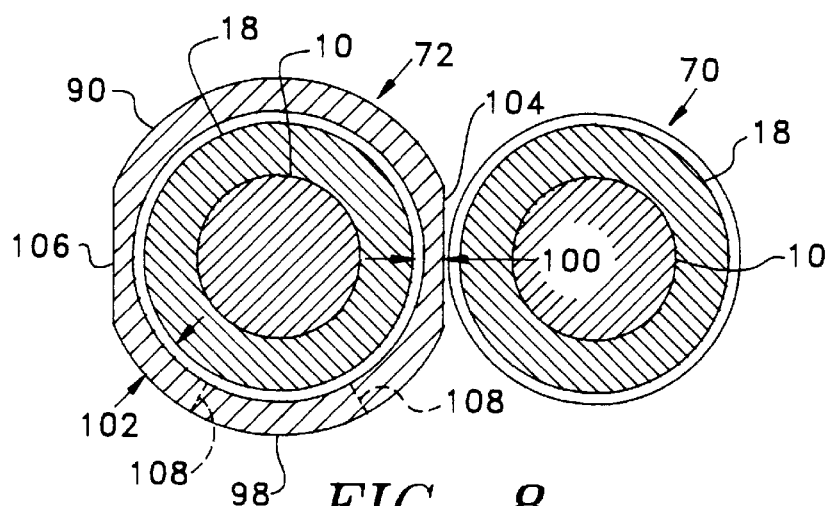
FIG. 8 is a cross-section taken through line 8—8 of FIG. 7.

Referring now to FIG. 8, a sectional view of left and right nut and bolt systems 70 and 72 shows bridge element 90 complementing and accommodating left nut and bolt system 72. The majority of wall 92 has a thickness 102. However, distance 100 between the two nuts of systems 70 and 72 is smaller than thickness 102. A section of wall 90 is removed, leaving accommodating surface 104. Wall 90 at accommodating surface 104 is thin enough to reside between nuts 18. As a result, bridge element 90 surrounds nut 18 of left nut and bolt system 72 and wall bottom edge 94 rests on surface 76. Wall 90 has a second accommodating surface 106 opposite accommodating surface 104, so that wall 90 can be used in a similar but reversed situation. Key opening 98 is an opening in wall 92 that allows a key to be inserted in key holes 54 of nut 18. Key opening 98 is a latitudinal opening in wall 92 and defined by vertical surfaces 108.

The invention is not limited to bridge elements of the configuration of bridge element 90. Bridge elements are designed not only to accommodate close pitched nut and bolt systems, but other situations such as narrow flanges and protruding equipment surfaces. However, the contact area between bridge element 90 and surface 76 cannot be so small so as to have hydraulic tensioner 120 exerting a force per area that would breach the structural integrity of flange 74.

Referring again to FIG. 7, hydraulic tensioner 120 comprises cylinder 122, piston 124 and hydraulic fitting 126. Cylinder 122 has female threads 128 to engage parallel male threads 14 on bolt 10. Piston 124 is annular and resides in cylinder 122. Hydraulic tensioner 120 is constructed such that when female threads 128 are engaged with bolt 10, cylinder 122 extends into bridge element 90 and piston 124 rests on top wall edge 96. To engage hydraulic tensioner 120, first bridge element is placed on surface 76 and around nut 18, then hydraulic tensioner 120 is rotated onto bolt 10 until piston 124 rests on bridge element 90. To stretch bolt 10, hydraulic fluid is pumped into cylinder 122 via hydraulic fitting 126, causing piston 124 to extend from cylinder 122. This results in cylinder 122 moving away from second end 22 of bolt 10, thus stretching bolt 10. This method of axial tensioning of bolts and studs allows the stretching of bolts and studs to be calibrated to a specific hydraulic load of hydraulic tensioner 120. This speeds the assembly process by requiring that a bolt or stud need only be stretched once. Further, it eliminates the need to measure the elongation of each bolt and stud.

Figure 9:
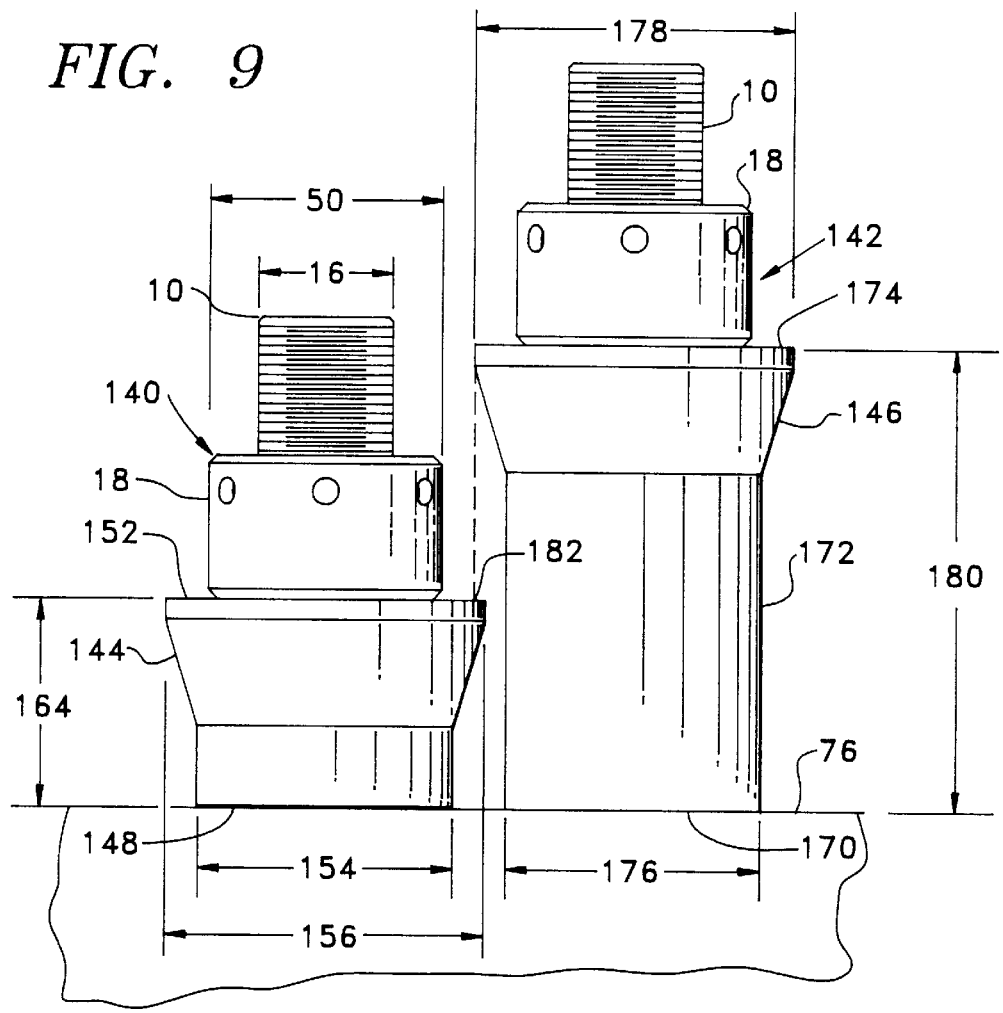
FIG. 9 illustrates an elevation of nut and bolt assemblies with different stool heights.

Left nut and bolt assembly 140 and right nut and bolt assembly 142, as depicted in FIG. 9, provide an alternate means to arrange a nut and bolt using stool 144 and tall stool 146, respectively. Stools 144 and 146 allow hydraulic tensioner 120 to be used to stretch a bolt when a bridge element cannot be used alone. Stool 144 has bottom face 148, stool body 150, top face 152, and bore 190 (see FIG. 10) extending from bottom face 148 to top face 152. Bore 190 has a diameter larger than diameter 16 of bolt 10. Bottom face 148 and top face 152 are round. Bottom face 148 has a diameter 154 that is approximately equal to outer diameter 50 of nut 18. Top face 152 has a diameter 156 which is larger than diameter 154. Stool body 150 has a height 164 as measured from bottom face 148 to top face 152.

Left nut and bolt assembly 140 is designed to allow a bridge element and hydraulic tensioner (not shown) to rest on top face 152 while tensioning bolt 10. This arrangement provides for the tensioning of bolt 10 even though no satisfactory bridge element could be designed to rest directly on surface 76. Further, the force from a hydraulic tensioner is distributed throughout the larger area of bottom face 148, as opposed to the smaller area consisting of where a wall bottom edge would rest on surface 76. As the force is distributed over a larger area, the risk of deforming surface 76 diminishes.

The combination of left and right nut and bolt assemblies 140 and 142, respectively, allow for closely pitched bolts 10 to be tensioned using a hydraulic tensioner. Nut and bolt assemblies 140 and 142 are similar in all respects except for height. Right nut and bolt assembly 142 has a tall stool 146, with a bottom face 170, a stool body 172, a top face 174, and a bore (not shown) extending from bottom face 170 to top face 174. The bore of tall stool 146 has a diameter larger than diameter 16 of bolt 10. Bottom face 170 and top face 174 are round. Bottom face 170 has a diameter 176 that is approximately equal to outer diameter 50 of nut 18. Top face 174 has a diameter 178 which is larger than diameter 176. Stool body 172 has a height 180 as measured from bottom face 170 to top face 174. Height 180 of tall stall 146 is greater than height 164 of stool 144. This difference in height allows portion 182 of top face 152 to lie in between top face 174 and surface 76. This arrangement allows for closely pitched bolts. This arrangement also necessitates the stretching of bolt 10 of left nut and bolt assembly 140 prior to the stretching of bolt 10 of right nut and bolt assembly 142.

Figure 10:
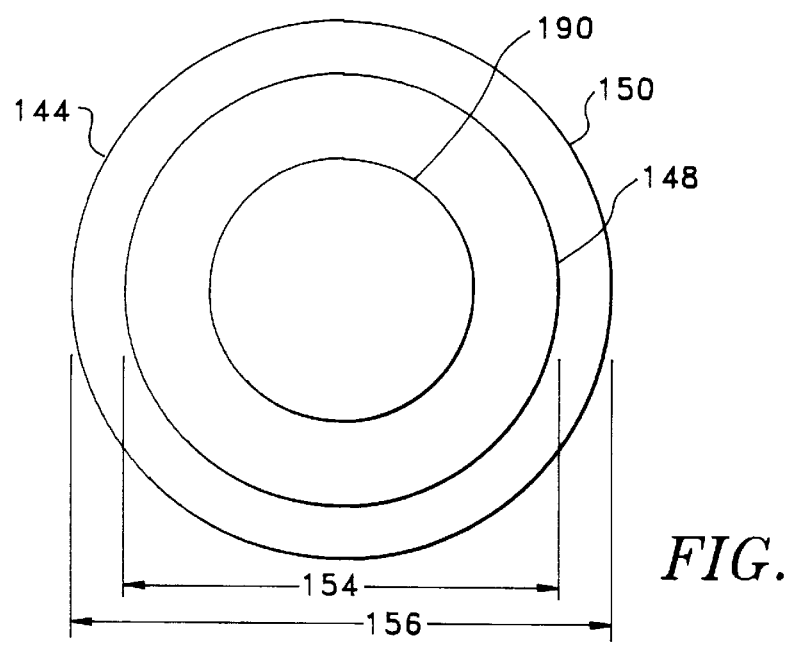
FIG. 10 illustrates a bottom plan view of a stool.

Referring to FIG. 10, bottom face 148 of stool 144 is pierced by bore 190, which is sized to accommodate bolt 10. Bottom face 148 has a diameter 154 which is smaller than diameter 165 of top face 152 (not visible). The bottom view of tall stool 146 is identical to FIG. 10. The invention is not limited, however, to stools with round bottoms and tops. Further, the invention is not limited to bottoms of the same diameter as the diameter of the nut which is adjacent to the stool's top face. All of these shapes can be constructed to complement and accommodate the surface of the flange and anything else in the vicinity of the bolt being tensioned.

Figure 11:
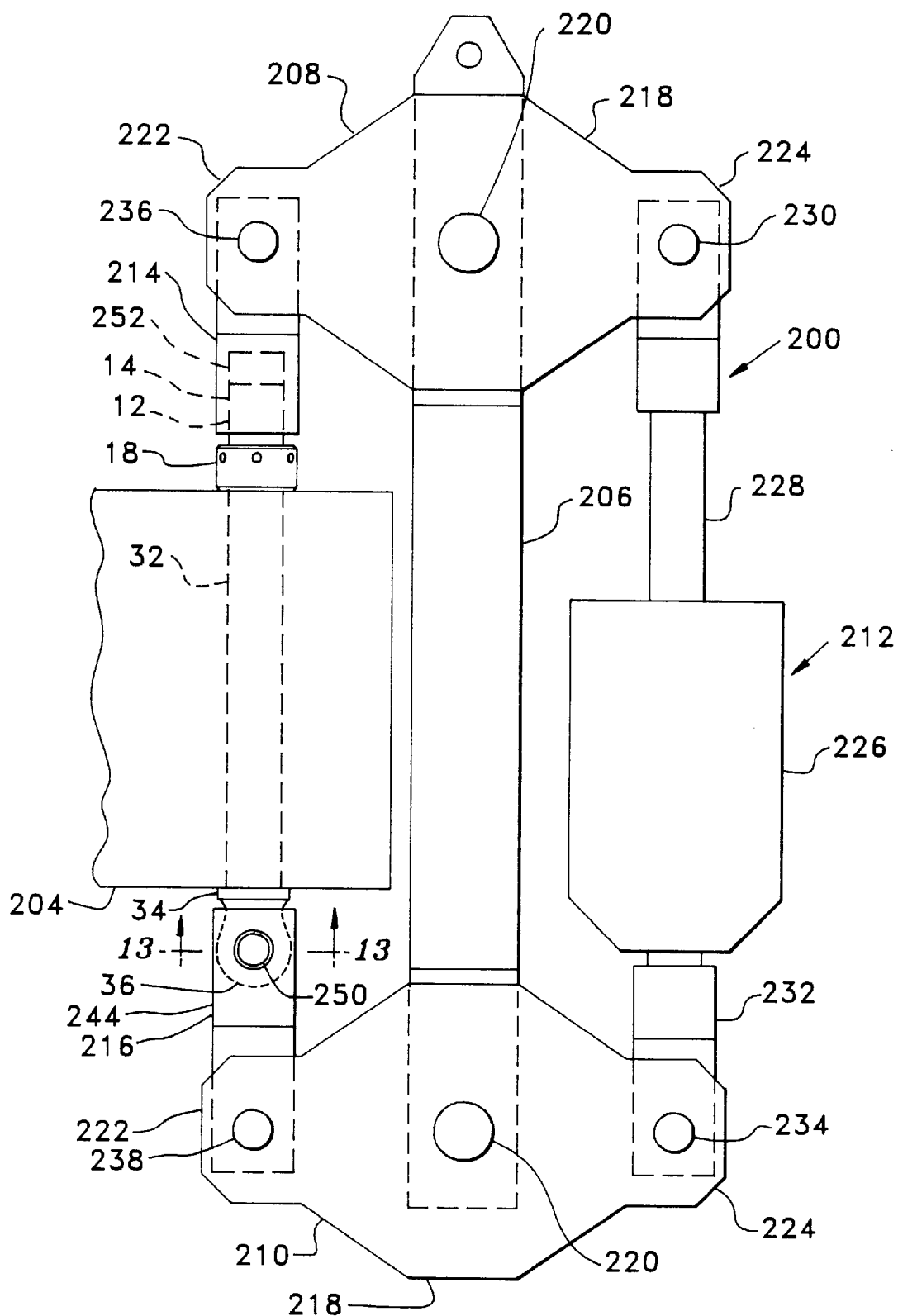
FIG. 11 illustrates a side plan view of a parallel action hydraulic tensioner stretching a bolt.
Figure 12:
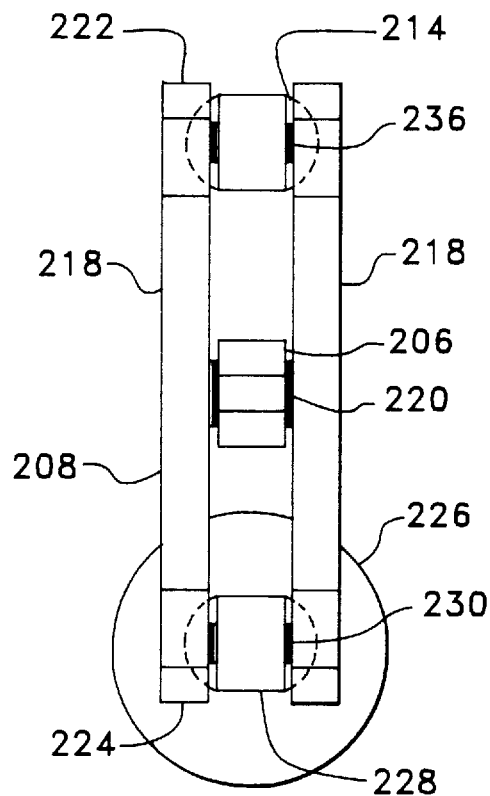
FIG. 12 illustrates a top plan view of a parallel action hydraulic tensioner.

Referring to FIGS. 11 and 12, parallel action hydraulic tensioner 200 is tensioning bolt 32 that extends through flanges 204. Tensioner 200 is an alternative tensioner to stretch bolts without resting a tensioner, either directly or indirectly, on flange 204. This is useful for when the flange is too small to accommodate a bridge element or the vicinity of the bolt being stretched does not allow for the use of hydraulic tensioner 120.

In the preferred embodiment, tensioner 200 is comprised of a central beam 206, a first member assembly 208, a second member assembly 210, a hydraulic load cell assembly 212, and a first attachment means 214 and a second attachment means 216 for attaching tensioner 200 to first and second ends 12 and 34 of ring bolt 32, respectively.

First and second member assemblies 208 and 210 are each a pair of identical plates 218. First and second member assemblies 208 and 210 have a front section 222 and a back section 224, depicted on the left and right of FIG. 11, respectively. Plates 218 straddle and are pivotally mounted to each end of central beam 206 via a pivot joint 220, respectively. Pivot joints 220 are located between front section 222 and a back section 224 of first and second member assemblies 208 and 210. First and second member assemblies 208 and 210 are mounted to central beam 206 such that the assemblies and plates 218 are parallel.

Hydraulic load cell assembly 212 is comprised of hydraulic load cell 226 with arms 228 and 232 which extend in opposite directions from hydraulic load cell 226. Arm 228 is connected at one end to the piston (not shown) of hydraulic load cell 226. The other end of arm 228 is pivotally connected via pivot joint 230 to back section 224 of first member assembly 208. Arm 232 is connected at one end to hydraulic load cell 226. The other end of arm 232 is pivotally connected via pivot joint 234 to back section 224 of second member assembly 210. As with central beam 206, plates 218 straddle arms 228 and 232.

Hydraulic load cell assembly 212, central beam 206, and first and second member assemblies 208 and 210 are arranged such that when hydraulic load cell 226 retracts its piston, back sections 224 of member assemblies 208 and 210 move closer to each other and front sections 222 move further apart. This is accomplished by first and second member assemblies 208 and 210 pivoting on pivot joint 220. The reverse result occurs when hydraulic load cell 226 extends its piston.

First attachment means 214 has an end that is pivotally connected via pivot joint 236 to front section 222 of first member assembly 208, similar to how arms 228 and 232 are connected to back sections 224. First attachment means 214 has another end that has a threaded sleeve 252 that engages parallel male thread 14 of ring bolt 32.

Figure 13:
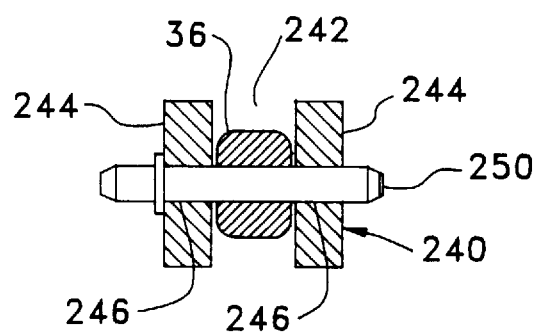
FIG. 13 illustrates a cross-section view of a ring of a ring bolt attached to a parallel action hydraulic tensioner.

Second attachment means 216 has an end that is pivotally connected via pivot joint 238 to front section 222 of second member assembly 210, similar to how first attachment means 214 is connected to front section 222 of first assembly member 208. Referring now to FIGS. 11 and 13, the other end 240 has a slot 242 between tongs 244. Slot 242 is parallel to plates 218 and is sized to accommodate ring 36 width-wise. Each tong 244 has a hole 246 extending through it, the holes 246 being aligned. Second attachment means 216 engages ring bolt 32 by inserting ring 36 in slot 242, aligning ring aperture 38 with holes 246, and inserting pin 250 through tongs 244 and ring 36.

Figure 14:
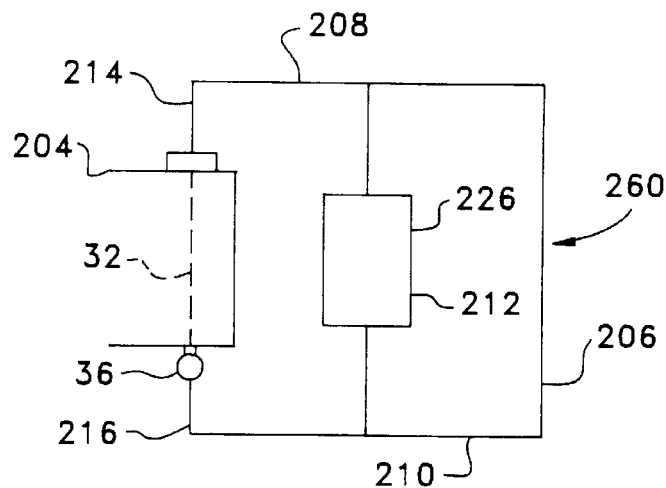
FIGS. 14, 15, and 16 illustrate schematic alternative arrangements of parallel action hydraulic tensioners.
Figure 15:
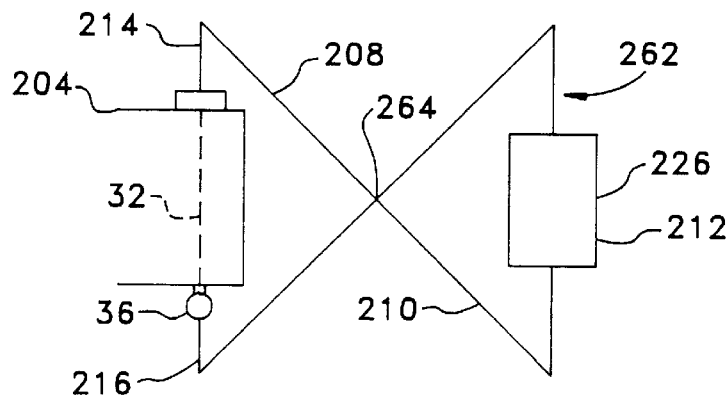
Figure 16:
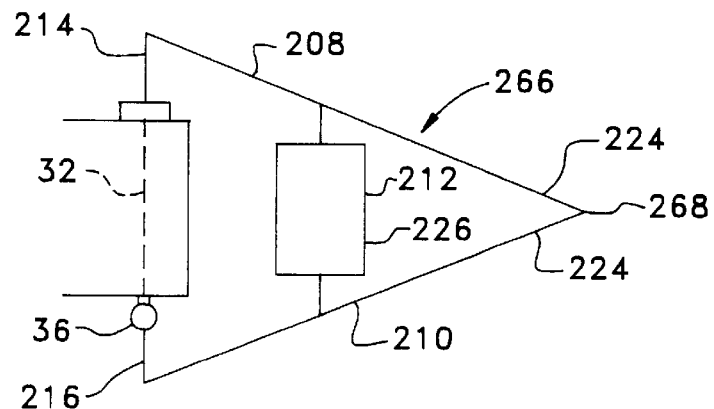

Once the ring bolt 32 is engaged to tensioner 200, ring bolt 32 can be stretched by hydraulic load cell 226 retracting its piston, causing front sections 222 to move apart and stretch ring bolt 32. Attention is drawn to central beam 206, which functions as a means for connecting first and second member assemblies 208 and 210. Alternative tensioner arrangements would also suffice. In FIG. 14, a schematic of an alternative parallel action tensioner 260 has central beam 208 and hydraulic load cell assembly 212 switched as compared to tensioner 200. In this arrangement, ring bolt 32 is stretched when the piston extends from hydraulic load cell 226. In FIG. 15, alternative parallel action tensioner 262 has central beam 206 removed and first and second member assemblies 208 and 210 crossed and connected via pivot joint 264. In this arrangement, ring bolt 32 is stretched when the piston extends from hydraulic load cell 226. In FIG. 16, alternative parallel action tensioner 266 is similar to alternative parallel action tensioner 260 except that central beam 206 is removed and first and second member assemblies 208 and 210 are connected via pivot joint 268 at back portions 224. As in the first two alternative parallel action tensioners, ring bolt 32 is stretched when the piston extends from hydraulic load cell 226.

The present invention may be embodied in other specific forms without departing from the spirit or essential attributes thereof and, accordingly, reference should be made to the appended claims, rather than to the foregoing specification, as indicating the scope of the invention.

I claim:

1. A method of axially tensioning a threaded member extending through a structure using an axial tensioning device, comprising the steps of:

a) inserting a threaded member having first and second ends through an aperture in said structure;

b) taking a first attaching member having a first end and attaching said first end of said first attaching member to said first end of said threaded member;

c) taking a second attaching member having a first end and attaching said first end of said second attaching member to said second end of said threaded member, said first and second attaching members being coupled through at least a first pivot joint; and d) axially tensioning said threaded member by applying a force to said first attaching member so as to cause rotation of at least said first attaching member about said first pivot joint, said force applied so that said first end of said first attaching member moves away from said first end of said second attaching member.

2. The method according to claim 1, wherein said first attaching member has a second end, and wherein the step of applying a force to said first attaching member comprises applying said force to said second end of said first attaching member.

3. The method according to claim 2, wherein said second attaching member has a second end, and wherein said first pivot joint couples said first attaching member to said second attaching member at a location on each of said attaching members that is disposed between said first and second ends thereof, whereby the step of applying said force to said second end of said first attaching member causes said second ends of said first and second attaching members to move further apart.

4. The method according to claim 2, wherein said second attaching member has a second end, and wherein said first and second attaching members are further coupled by a beam having first and second ends, said first pivot joint formed between said first attaching member and a first end of said beam, and wherein the step of applying said force to said first attaching member causes said second ends of said first and second attaching members to move closer together.

5. The method according to claim 1, wherein each of said first and second attaching members has a second end, and wherein the step of applying said force acting on said first attaching member comprises applying said force at a location on said first attaching member disposed between said first and second ends of said first attaching member.

6. The method according to claim 5, wherein said first pivot joint couples said second end of said first attaching member to said second end of said second attaching member, and wherein said location at which said force is applied to said first attaching member is disposed between said first pivot joint and said first end of said first attaching members.

7. The method according to claim 5, wherein said first and second attaching members are further coupled through a second pivot joint, said first pivot joint formed between said first attaching member and a first end of a beam, said second pivot joint formed between said second attaching member and a second end of said beam, and wherein said location at which said force is applied to said first attaching member is disposed between said first pivot joint and said first end of said beam.

8. The method according to claim 1, wherein said first end of said threaded member has parallel threads formed thereon, and further comprising the steps of threading a threaded nut onto said parallel threads after placing a coil insert between said nut and said parallel threads.

9. The method according to claim 1, wherein the step of axially tensioning said threaded member further comprises applying said force to said second attaching member simultaneous with said application of said force to said first attaching member so as to cause rotation of said second attaching member about said first pivot joint in a direction opposite to said rotation of said first attaching member about said first pivot joint.

10. The method according to claim 9, wherein each of said first and second attaching members has a second end, and wherein the step of applying said force to said first and second attaching members comprises applying said force to said second ends of each of said attaching members.

11. The method according to claim 10, wherein said first pivot joint couples said first attaching member to said second attaching member at a location on each of said attaching members that is disposed between said first and second ends thereof, and wherein the step of applying said force to said second ends of said first and second attaching members causes said first and second ends to move further apart.

12. The method according to claim 9, wherein each of said first and second attaching members has a second end, and wherein the step of applying said force acting on said first and second attaching members comprises applying said force at locations on said first and second attaching member disposed between said first and second ends of said first attaching member.

13. The method according to claim 12, wherein said first pivot joint couples said second end of said first attaching member to said second end of said second attaching member, and wherein said locations at which said force is applied to said first and second attaching members is disposed between said first pivot joint and said first ends of said first attaching members.

14. The method according to claim 1, wherein said first and second attaching members are further coupled by a beam having first and second ends and a second pivot joint, said first pivot joint formed between said first attaching member and a first end of said beam, said second pivot joint formed between said second attaching member and said second end of said beam, and wherein the step of applying said force to said first attaching member causes said first attaching member to rotate about said first pivot joint in a first direction, and wherein the step of axially tensioning said threaded member further comprises the step of applying said force to said second attaching member simultaneous with said application of said force to said first attaching member so as to cause rotation of said second attaching member about said second pivot joint in a second direction, said second direction being opposite to said first direction.

15. The method according to claim 14, wherein each of said first and second members has a second end, wherein the step of applying said force to first and second members comprises applying said force to said second ends of said first and second member so as to cause said second ends of said first and second members to move closer together.

16. The method according to claim 1, wherein said first end of said threaded member has parallel threads formed thereon, and further comprising the step of threading a threaded nut onto said parallel threads.

17. The method according to claim 16, further comprising the step of inserting a coil insert between each of said nut and said parallel threads of said threaded member.

* * * * *